(12) United States Patent
Steinmoeller

(10) Patent No.: US 8,457,271 B2
(45) Date of Patent: Jun. 4, 2013

(54) RADIOACTIVE DEBRIS TRAP

(75) Inventor: Franz Ernst Steinmoeller, Kitchener (CA)

(73) Assignee: Babcock & Wilcox Canada Ltd., Cambridge, Ontario (CA)

( * ) Notice: Subject to any disclaimer, the term of this patent is extended or adjusted under 35 U.S.C. 154(b) by 887 days.

(21) Appl. No.: 12/609,026

(22) Filed: Oct. 30, 2009

(65) Prior Publication Data

US 2011/0103538 A1    May 5, 2011

(51) Int. Cl.
*G21C 19/42*  (2006.01)
(52) U.S. Cl.
USPC ............................. 376/312; 376/313
(58) Field of Classification Search
USPC .................................. 376/308–316
See application file for complete search history.

(56) References Cited

U.S. PATENT DOCUMENTS

| | | | |
|---|---|---|---|
| 4,684,496 A | 8/1987 | Wilson et al. | |
| 5,468,397 A * | 11/1995 | Barboza et al. | 210/798 |
| 6,890,443 B2 | 5/2005 | Adams | |
| 7,037,436 B2 | 5/2006 | Use et al. | |
| 2008/0013667 A1 * | 1/2008 | Oh et al. | 376/451 |
| 2008/0185325 A1 | 8/2008 | Murray et al. | |
| 2010/0276124 A1 * | 11/2010 | Klarner | 165/134.1 |

* cited by examiner

*Primary Examiner* — Jack Keith
*Assistant Examiner* — Timothy A Brainard
(74) *Attorney, Agent, or Firm* — Eric Marich

(57) ABSTRACT

A radioactive debris trap to be installed in a steam generator for removing debris in the primary flow of a nuclear power plant's primary heat transport system. The debris trap includes an outer cylinder and a coaxial inner cylinder both having a top end and a bottom end. A top plate connects the top ends of the outer and inner cylinders. A bottom plate which encloses the trap is connected to the bottom end of the outer cylinder. There is a gap between the bottom end of the inner cylinder and the bottom plate through which primary flow enters a settling chamber located in an annular gap between the outer and inner cylinders. Several small holes are located at the top end of the outer cylinder through which liquid exits the debris trap. A means for fixedly connecting the debris trap to the steam generator is provided on the outer surface of the outer cylinder. Also included is a means for removing the radioactive debris trap from the steam generator without exposing personnel to excessive radiation.

9 Claims, 9 Drawing Sheets

RADIOACTIVE DEBRIS TRAP

FIELD AND BACKGROUND OF THE INVENTION

1. Field of the Invention

The present invention relates generally to the field of nuclear reactors and in particular to a radioactive debris trap to be installed in the primary outlet plenum of a steam generator for removing fine particles and chips of metal from the primary heat transport system of a nuclear power plant.

2. Description of the Related Art

Referring to FIG. 1, and as described in *Steam/its generation and use,* 40th Edition, Stultz and Kitto, Eds., Copyright©1992, The Babcock & Wilcox Company, and *Steam/its generation and use,* 41st Edition, Kitto and Stultz, Eds., Copyright©2005, The Babcock & Wilcox Company, recirculating steam generators (RSGs) used in nuclear power plants are supplied by a number of manufacturers worldwide as part of pressurized water reactor (PWR) or pressurized heavy water reactors (PHWR) (mainly CANDU) systems. These are large devices, ranging in height from approximately 38 to 73 ft (11.6 to 22.3 m) and weighing from approximately 50 to 790 tons (45 to 717 tm) each. Each RSG is a vertical shell, inverted U-tube heat exchanger with steam-water separation equipment located above the tube bundle inside the upper shell (or steam drum). A cylindrical shroud or bundle wrapper surrounds the tube bundle separating it from the lower shell. This creates an annular region which serves as the downcomer to return the recirculated water from the steam separators to the tube bundle inlet at the bottom of the unit. In a feed ring type RSG, generally designated 100 as illustrated in FIG. 1, feedwater is introduced by a nozzle and header to the top of the downcomer, and flows with the separator return flow down and into the tube bundle. In a preheater type RSG, feed flow enters the steam generator through a nozzle and feedwater distribution box to the baffled section at the cold leg outlet end of the tube bundle where it is heated to saturation before joining with the hot leg riser flow within the tube bundle.

The flow configuration and the major design features of a typical feed ring type RSG are as follows. The hot primary coolant enters a portion of the vessel primary head 110, via primary inlet nozzle 120, which is separated into two plenums 130, 140 by a divider plate 50. The primary coolant flows through the inside of the U-tube bundle 150 and exits the steam generator 100 through the primary head outlet plenum 140 and primary outlet nozzle 160. In most RSG designs, the U-tubes make a continuous 180 degree bend at the top of the tube bundle. In the configuration shown, secondary-side feedwater enters the upper shell 170 via feedwater nozzle 180 and is conveyed to a feed ring (not shown) and is mixed with water returning from the steam-water separation equipment 190 located in the upper shell 170. The water flows down the downcomer annulus between the shroud and the shell to the tubesheet where it enters the tube bundle. The secondary-side water is heated as it passes up through the tube bundle generating steam through nucleate boiling heat transfer, creating a two-phase flow. Steam of 10 to 40% quality, depending on hot-side or cold-side U-tube bundle location, exits the tube bundle and is distributed to the primary and secondary steam separation equipment 190 in the upper shell 170 to send effectively moisture-free (<0.25% water) steam to the secondary-side power cycle via steam outlet nozzle 200. Water leaving the steam separators is recirculated down the annulus where it mixes with the feedwater before being returned to the bundle inlet for further steam generation.

During operation, debris can sometimes begin to accumulate in the primary coolant loop or primary heat transport (PHT) system of such steam generators 100. Depending upon the source of the debris, the type of debris which can typically be found in a PHT system can measure 1 square mm or less, or the debris fragments can be as large as 2 mm wide by 4 mm long. Damage and defects caused by debris can cause a problems for nuclear power plants. Thus, it logically follows that various debris trapping devices have been developed in response to the industry wide problems caused by debris.

For example, U.S. Pat. No. 4,684,496 to Wilson et al. ("Wilson") describes a debris trap for a pressurized water nuclear reactor to be installed into the reactor vessel itself. The debris trap disclosed in Wilson is mounted within a bottom nozzle of a fuel assembly so as to capture and retain debris carried by coolant flowing from the lower core plate openings of a nuclear reactor to a fuel assembly and is made up of a plurality of straps aligned with one another in a crisscross arrangement.

However, due to the large scope of the problems caused by debris in nuclear power plants, there remains a clear need for a simple debris trap which can remove a greater amount of debris and reduce the problems caused by debris.

SUMMARY OF THE INVENTION

One aspect of the present invention is drawn to a radioactive debris trap that is capable of targeting and removing a higher than average concentration of debris particles, i.e., fine particles and chips of metal, from a nuclear power plant's primary heat transport (PHT) system without disrupting all of the primary flow the system. Another aspect of the present invention is drawn to a simple yet effective radioactive debris trap which can be installed in any type of steam generator.

Accordingly, one aspect of the present invention is drawn to a radioactive debris trap configured to be installed in a steam generator for the purpose of removing debris which is entrained in a primary flow of a nuclear power plant's PHT system. The debris trap is made entirely of metal and includes an outer cylinder having an outer surface, a top end and a bottom end having a perimeter. The invention also includes a coaxial inner cylinder located within the outer cylinder. The inner cylinder includes a top end and a bottom end. Additionally, a top plate connects the top end of both the outer cylinder and the inner cylinder. A plurality of small holes is located at the top end of the outer cylinder. Liquid contained in the primary flow exits the debris trap through these holes. Also, the plurality of holes are sized to ensure that the gravitational force exerted on the debris entrained in the primary flow is larger than the upward drag force exerted on that debris by the flow itself.

The debris trap of the present invention includes an annular cavity which is located between the outer cylinder and the inner cylinder. The annular cavity contains a settling chamber positioned below the plurality of small holes. A bottom plate encloses the radioactive debris trap and is connected to the perimeter of the bottom end of the outer cylinder. A gap is located between the bottom end of the inner cylinder and the bottom plate. Primary flow with debris entrained therein enters the settling chamber through this gap. The present invention also includes a means for fixedly connecting the radioactive debris trap to the steam generator which is fixedly attached to the outer surface of the outer cylinder on the back side of the debris trap. Additionally a means for removing the radioactive debris trap from the steam generator without exposing personnel to excessive radiation is provided on the front side of the debris trap. The preferred embodiment for this means includes three female support brackets which are triangularly arranged with respect to each other and which include an uppermost centrally positioned female support bracket. The means for removing the radioactive debris trap from the steam generator also includes a remote robotic arm which is configured with three complementary male support brackets which engage the female support brackets attached to the front of the debris trap.

The various features of novelty which characterize the invention are pointed out with particularity in the claims annexed to and forming a part of this disclosure. For a better understanding of the invention, its operating advantages and specific benefits attained by its uses, reference is made to the accompanying drawings and descriptive matter in which a preferred embodiment of the invention is illustrated.

DESCRIPTION OF THE INVENTION

Figure 2:
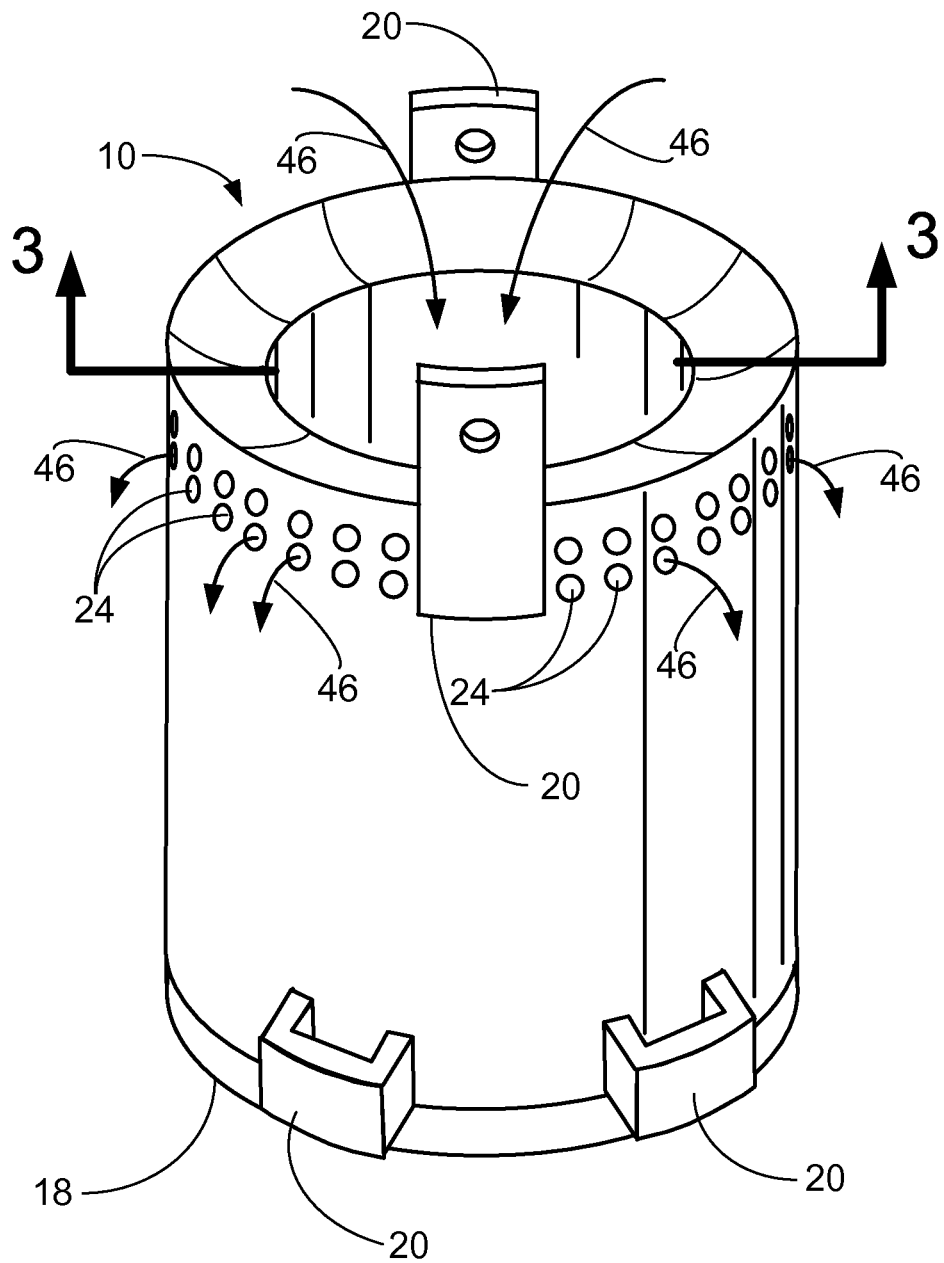
FIG. 2 is a perspective view of a radioactive debris trap according to the preferred embodiment of the present invention.
Figure 3:
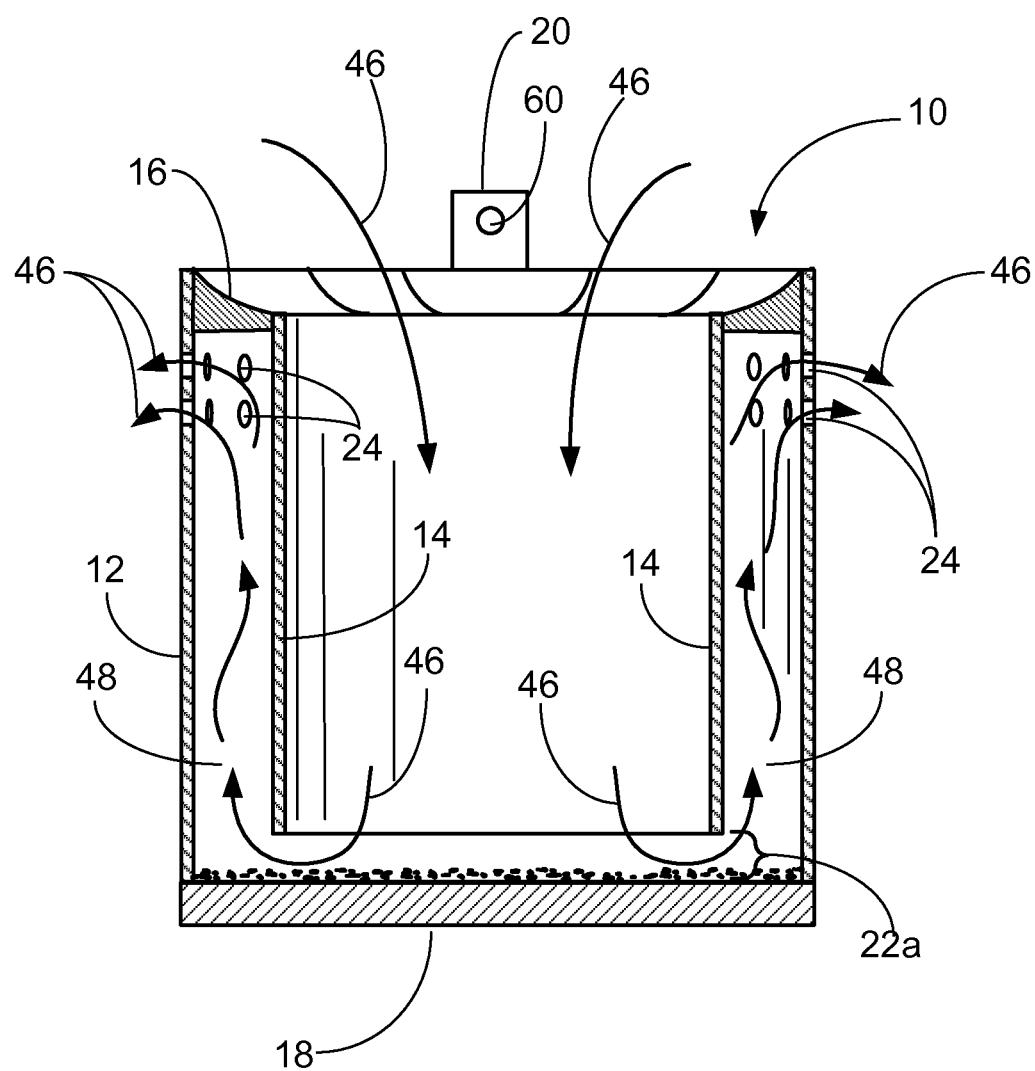
FIG. 3 is a sectional view of the debris trap of FIG. 2, viewed in the direction of arrows 3-3 of FIG. 2.

Referring now to the drawings, wherein like reference numerals are used to refer to the same or functionally similar elements throughout the several drawings, FIGS. 2 and 3 show a preferred embodiment of the radioactive debris trap 10 of the present invention. The present invention can be installed in the primary head of a U-tube type recirculating steam generator (RSG) 100 for removing fine particles and chips of metal from a primary flow 46 of a nuclear power plant's primary heat transport (PHT) system.

As shown in FIGS. 2 and 3, among its major components, the preferred embodiment of the radioactive debris trap 10 which has a front side and a back side includes an outer cylinder 12 and a coaxial inner cylinder 14 positioned within the outer cylinder 12. Both the outer cylinder 12 and the inner cylinder 14 have a top end as well as a bottom end and the outer cylinder 12 has an outer surface. Additionally, a conical top plate 16 connects the outer metallic cylinder 12 to the inner metallic cylinder 14. The top plate 16 functions to direct debris toward the trap 10 and to prevent any particles from exiting the top of the trap 10. Alternatively, the top plate 16 can be a planar surface which may be flat or inclined In addition, a bottom plate 18 is attached to the entire perimeter of the bottom end of the outer cylinder 12 and hence closes the entire bottom of the trap 10. Also a means for fixedly connecting the radioactive debris trap 10 to the steam generator 100, preferably to the divider plate 50, is fixedly attached to the outer surface of the outer cylinder 12 on the back of the debris trap 10. For example, FIG. 2 shows three female support brackets 20 which are fastened to the outer surface of the outer cylinder 12. These female support brackets 20 are also triangularly arranged with respect to each other. The three female support brackets 20 serve the purpose of facilitating attachment to the steam generator 100 divider plate 50 shown in FIG. 1. However, other means of attachment may be used. For example such means could include male support brackets 32, similar to those shown in FIG. 5 and discussed in greater detail below, which are attached to the debris trap 10 and which are designed to engage with female supports. Also a design which uses bolted connections is another potential means of attaching the debris trap 10 to the steam generator 100. As shown, a similar set of support brackets 20 are provided on an opposite side of the debris trap 10 to facilitate its installation and removal using either manual or robotically controlled tooling, as described later in this specification.

A plurality of small holes 24 which are sized to ensure low upward velocity in the settling chamber are located at the top end of the outer cylinder 12. Liquid contained in the flow 46 exits the debris trap 10 through these holes 24, while debris swept into the debris trap 10 along with the primary flow 46 remains trapped therein.

The preferred embodiment of the radioactive debris trap 10 includes a gap 22a which is located between the bottom of the inner cylinder 14 and the bottom plate 18. This gap 22a allows the flow 46 to sweep the debris particles outward into a settling chamber 48 which is located in an annular cavity positioned between the outer cylinder 14 and the inner cylinder 12. As explained in more detail below, upward fluid velocity in the settling chamber is kept below the settling velocity to cause the debris that enters the debris trap 10 to settle out and remain in the settling chamber 48 or on the bottom plate 18.

The preferred embodiment of the debris trap 10 is made entirely of steel of a grade suitable to withstand the temperatures, stresses, flow conditions and chemistry conditions encountered in the steam generator.

Figure 4:
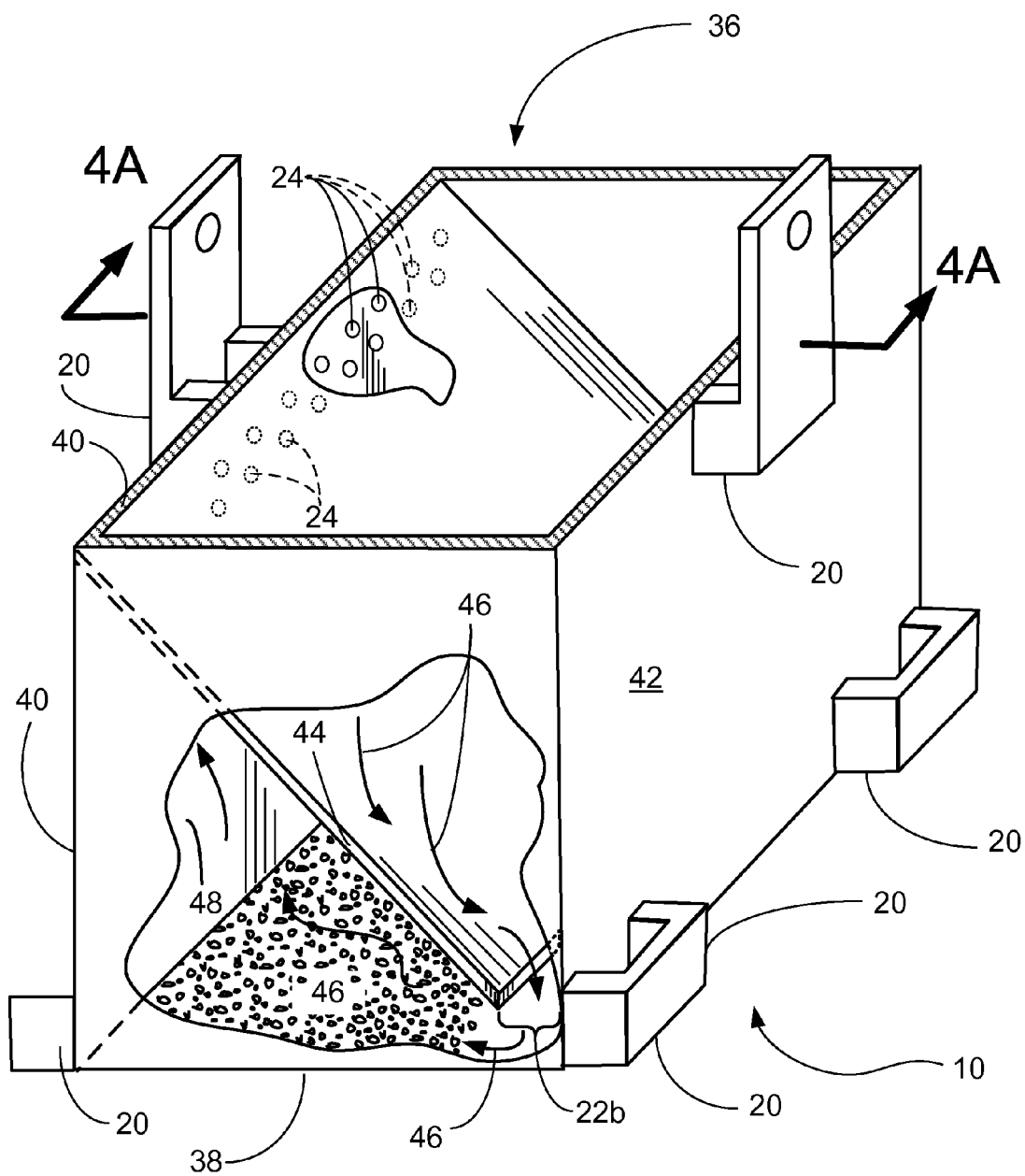
FIG. 4 is a perspective view of a radioactive debris trap according to another embodiment of the present invention.
Figure 4A:
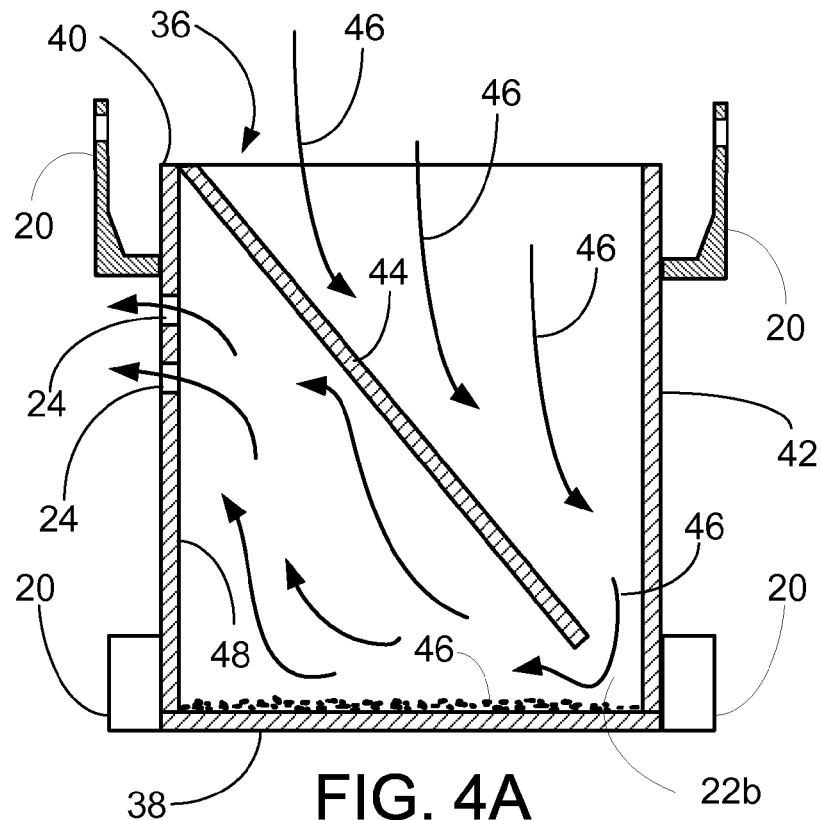
FIG. 4A is a sectional view of the debris trap of FIG. 4, viewed in the direction of arrows 4A-4A of FIG. 4.

FIGS. 4 and 4A illustrate another embodiment of the debris trap 10 according to the present invention. The embodiment shown in FIGS. 4 and 4A includes an open-topped box 36 having a bottom 38, a front side 40, a back side 42, a right side and a left side. The front side 40 of the open-topped box 36 has a top end and a bottom end and a back side 42 of the open-topped box 36 has a top end, a bottom end as well as an outer surface. Although FIG. 4 shows the open-topped box 36 having a rectangular shape, the debris trap 10 can take any shape which will not prevent it from accomplishing its desired function. For example, the open-topped box 36 can be square.

Moreover, the embodiment of FIGS. 4 and 4A also includes an angled plate 44 located inside the open-topped box 36. The angled plate 44 is positioned to direct the flow 46 and the debris entrained therein into the debris trap 10 and it has a front end, a right side, a left side and a back end. The front end of the angled plate is fixedly attached to the front side 40 of the open-topped box 36 and is flush with the top end of the box 36. The right and left sides of the angled plate 44 are fixedly attached to the right side of the open-topped box 36 and the left side of the open-topped box 36 respectively. The back end of the angled plate 44 is proximate yet unconnected to both the bottom of the open-topped box 36 and the back side 42 of the open-topped box 36.

Between the back end of the angled plate 44 and the back side 42 of the open-topped box 36 is provided a flow slot 22b. It is at this point that the flow 46 enters the debris trap 10. Additionally similar to the preferred embodiment, the embodiment shown in FIGS. 4 and 4A includes a means for fixedly attaching the radioactive debris trap 10 to the steam generator divider plate 50 attached to the outer surface of the back side 42 of the open-topped box 36, as well as means for facilitating its installation and removal using either manual or robotically controlled tooling, as described later in this specification. FIG. 4 shows the three female support brackets 20 fastened to the back surface 42 of the debris trap 10.

Furthermore, the debris trap 10 of the present invention is designed to employ the same arrangement of female support brackets 20 on the front as well as the rear of the trap 10 to securely engage the male support brackets 32 on both the debris trap support 26 for attachment as well as on a robotic arm R removal tool, discussed below. Additionally, more or fewer support brackets 20 could be used. Alternatively, male support brackets 32 could be attached to the debris trap 10 which are designed to engage with female support brackets 20. Also designs using bolted connections are another potential means of attaching the trap 10 to the steam generator.

Figure 6:
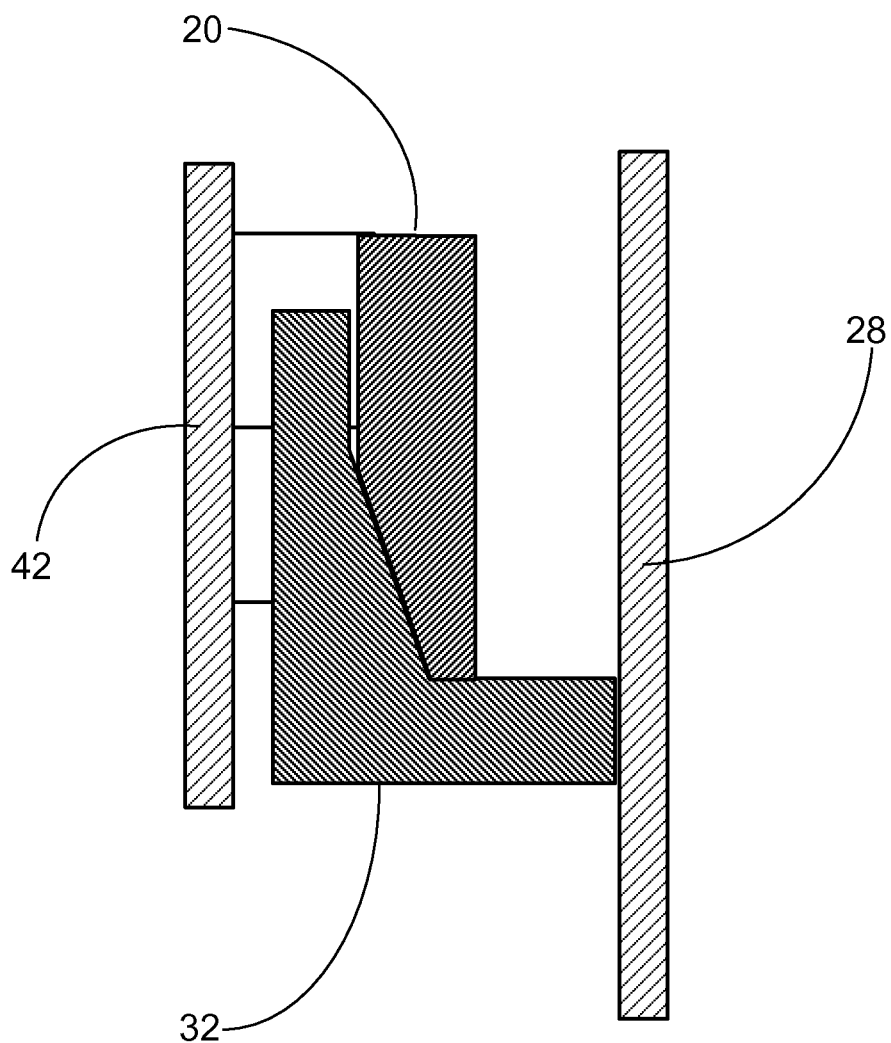
FIG. 6 is a schematic cross sectional view showing the debris trap's lower female support bracket connected to the base support plate's male support bracket.
Figure 6A:
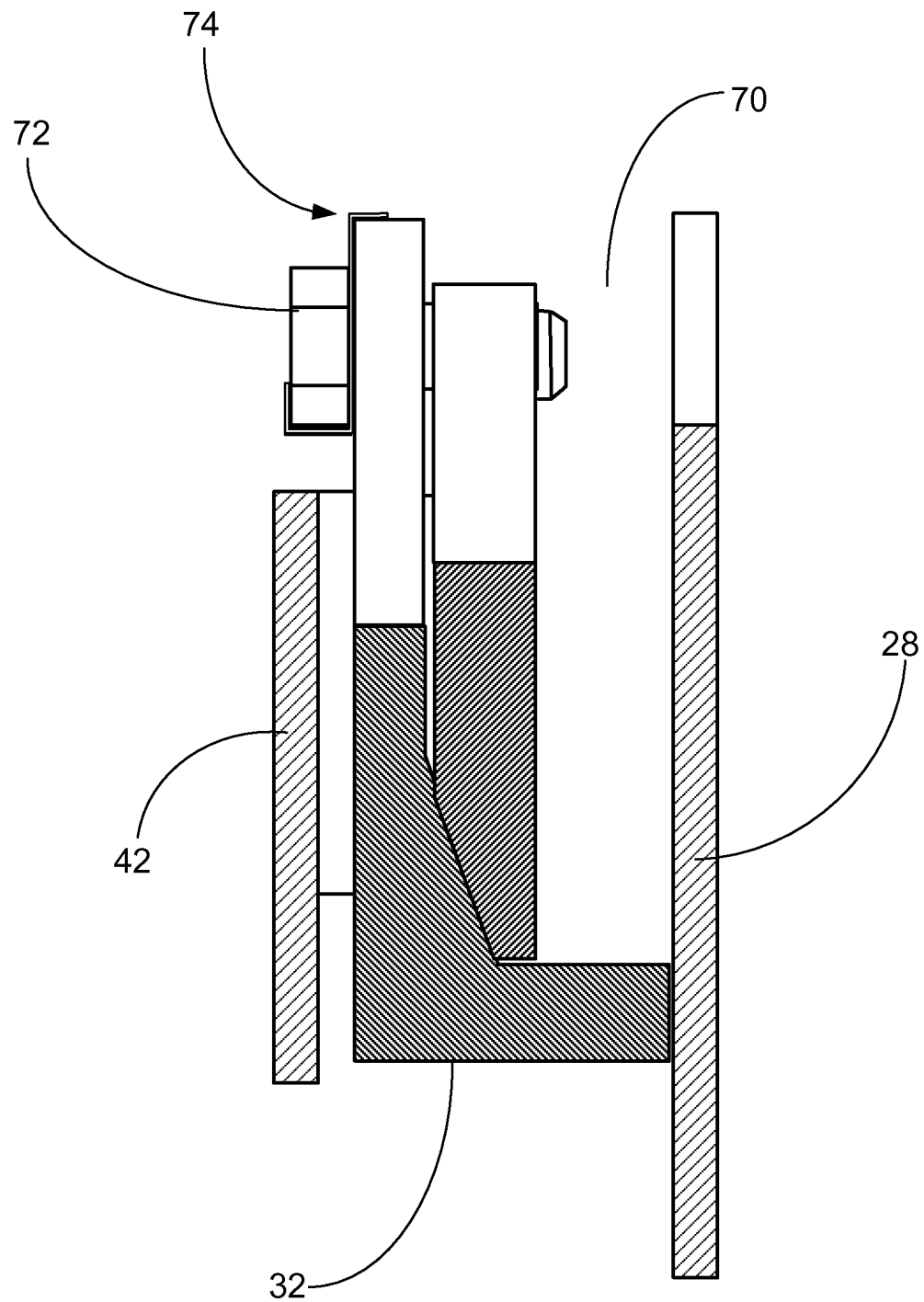
FIG. 6A is a schematic cross sectional view showing the debris trap's upper female support bracket connected to the base support plate's male support bracket.
Figure 7A:
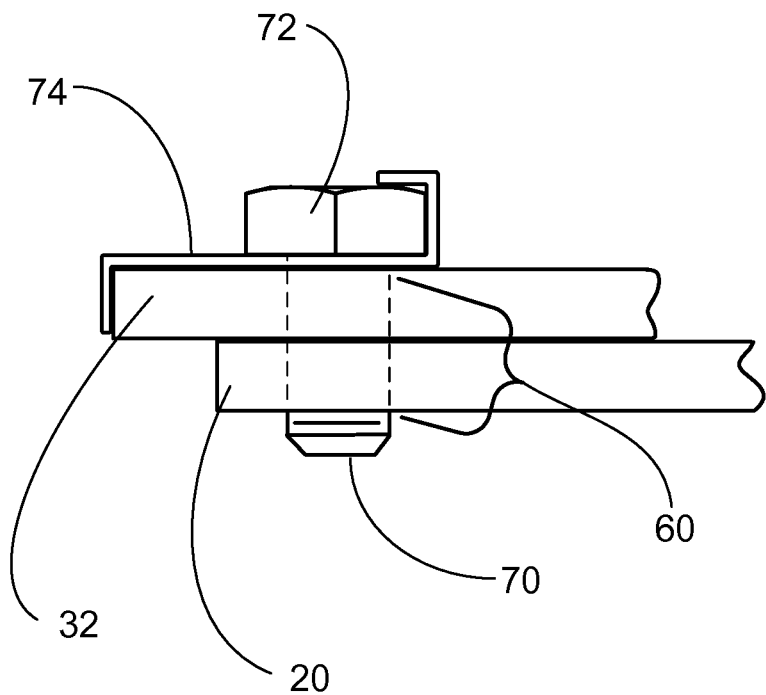
FIG. 7A is a side view of a hex head locking tab bolt.
Figure 7B:
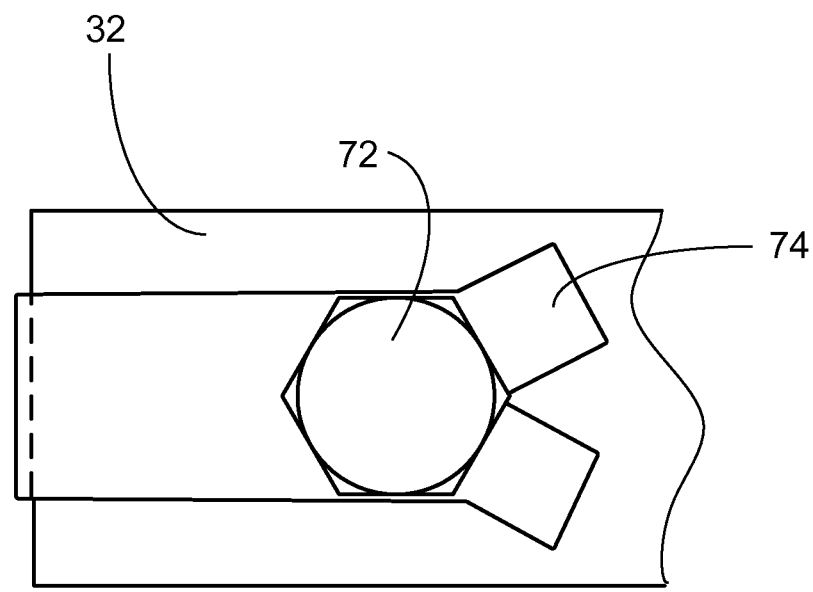
FIG. 7B is a top view of a hex head locking tab bolt with the locking tabs in the open, unfolded position.

Additionally as illustrated in FIGS. 7A and 7B, both of the above mentioned embodiments of the present invention may include a bolt 70 and a locking tab 74 for engaging the bolt hex head 72 to ensure the trap 10 cannot move upwards and become disengaged from the steam generator divider plate 50. Under certain circumstances, the bolt 70 may not be required if analysis and flow conditions indicate that upward movement of the debris trap 10 is unlikely. The locking tab 74 is fabricated from sheet metal. The uppermost center bracket of both the male brackets 32 and the female brackets 20 are fitted with a pilot hole 60 to engage the bolt 70. Additionally, the locking tab 74 includes a lip to fold over the edge of the male or female bracket 32, 20 so the bolt 70 cannot turn. Alternatively, the bolt 70 can also be welded to the brackets 20, 32 or to a plate so it will not turn and then bent over the hex head portion 72 of the bolt 70 to prevent the bolt 70 from turning. Also as seen in FIGS. 6 and 6A, an angle is machined on the face of the support brackets 20, 32 to ensure a snug fit.

Additionally, the embodiment of the present invention shown in FIG. 4 also includes a plurality of small holes 24 positioned across the top of the front face 40 of the open top box 36. These small holes 24 are positioned on top of the settling chamber 48 and as explained in more detail below, they are sized to ensure low velocities in the settling chamber 48.

Figure 1:
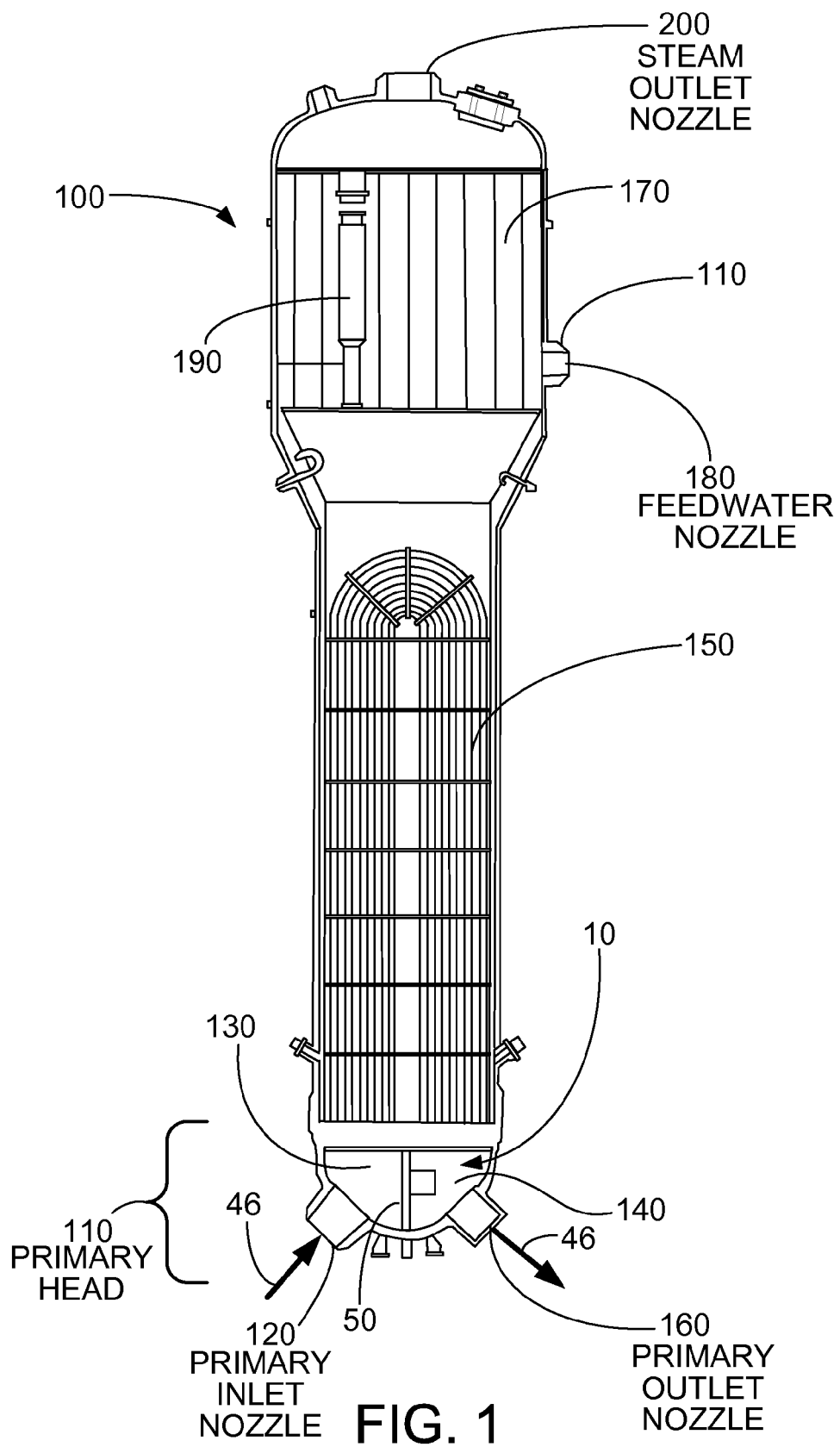
FIG. 1 is a schematic cross sectional view of a recirculating steam generator having a primary heat transport system, and showing an example of where the radioactive debris trap of the present invention can be installed.

All embodiments of the debris trap 10 of the present invention are securely fixed to a support bracket that is welded or bolted to an existing divider plate 50 in a steam generator 100 as shown in FIG. 1. The divider plate 50 is attached to the side of the primary head and to the bottom of the tubesheet and directs the flow 46 from the primary inlet nozzle 120 through the U-tubes 150 in the steam generator 100 back into the primary outlet plenum 140 and into the primary outlet nozzle 160. Moreover, for steam generators 100 with bolted type divider plates (not shown), the support bracket can be designed to use existing bolting arrangement holes.

Moreover, the inventive debris trap 10 is securely fixed to a means for connecting the debris trap 10 to the divider plate 50 or at another location in the primary outlet plenum 140 of the steam generator 100. In the preferred embodiment, this means is attached to the outer surface of the outer cylinder 12. In the embodiment shown in FIGS. 4 and 4A, this means is attached to the outer surface of the back side 42 of the open-topped box 36.

Figure 5:
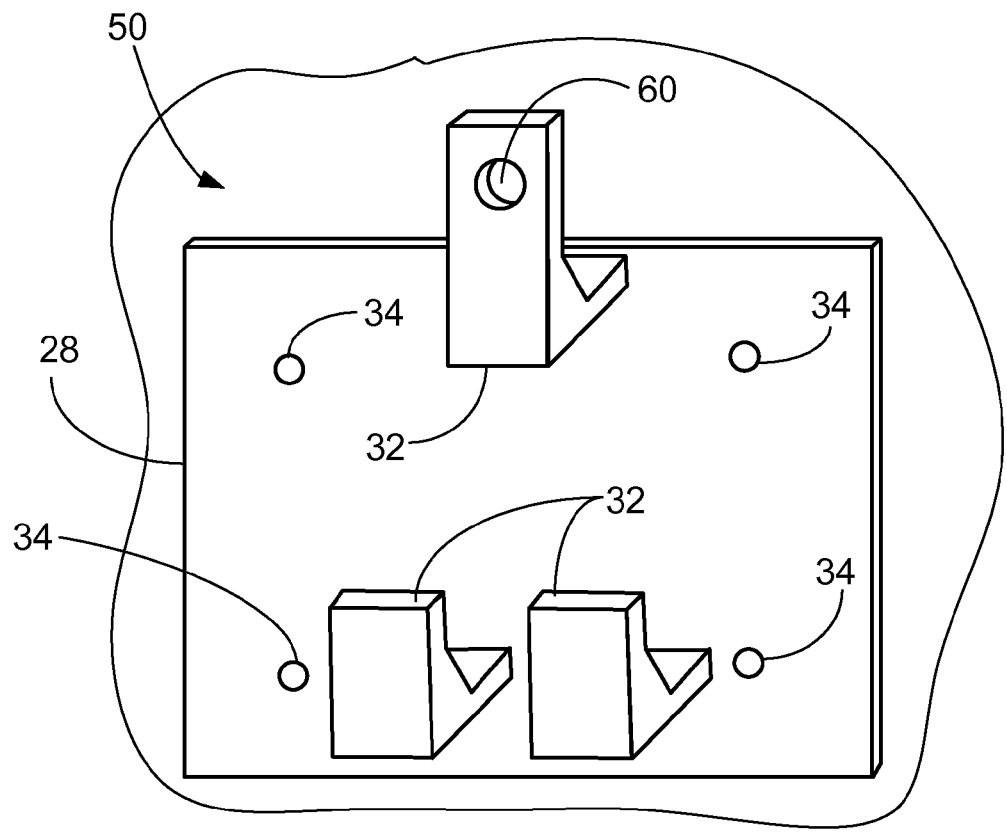
FIG. 5 is a perspective view of the support for the radioactive debris traps illustrated in FIGS. 2, 3, 4 and 4A, as located on a divider plate of a recirculating steam generator.

As shown in FIG. 5 the means for attaching the trap 10 to a steam generator may take the form of a debris trap support base plate 28 which has a back surface that is fixedly attached to a divider plate 50 of the steam generator 100. The debris trap support base plate 28 as shown in FIG. 5 also includes three male support brackets 32 which supports the debris trap 10 and are designed to engage with the female support brackets 20 shown in FIGS. 2, 3, 4 and 4A. As illustrated in FIGS. 6 and 6A, to ensure the trap 10 is securely fastened to the debris trap support base plate 28 the preferred embodiment includes angled faces on the male and female support brackets 32, 20 to ensure a snug fit. As described above, fasteners may be required to secure the debris trap 10 to the debris trap support base plate 28. The preferred embodiment for the fastener is a bolt with a thin sheet metal locking tab, which is required to ensure the bolt does not come loose, that is screwed to a threaded connection on the upper male support bracket and hence ensures the trap cannot move upwards and become disengaged from the supports. Any reasonable means of attachment which is sufficiently strong can be used, if required. Also, shown in FIG. 5 are four pilot holes 34 which could accommodate fasteners such as bolts or rivets. The preferred embodiment would be bolts with locking tabs as this design has proven operating experience. Alternatively, the trap 10 can be welded to the divider plate 50, but this would make removal more difficult. It will be appreciated that while FIG. 5 illustrates a debris trap support base plate 28 suitable for the FIGS. 4 and 4A embodiment, support brackets on the debris trap support base plate 28 suitable for the FIG. 3 embodiment would be angled or curved as necessary to accommodate the curved outer surface of the debris trap 10.

Figure 8:
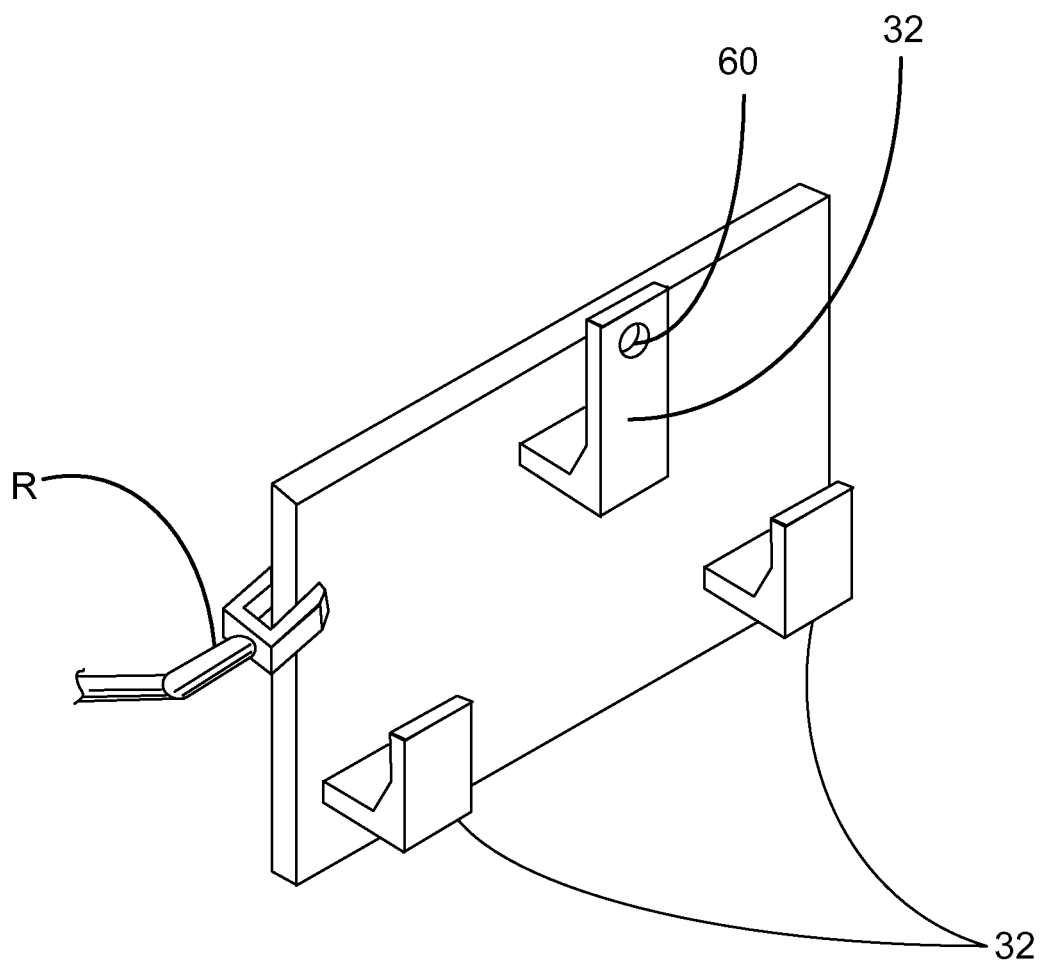
FIG. 8 is a conceptual perspective view of a remote tooling robotic arm used to install or remove the embodiments of the present invention.

As mentioned above, both embodiments of the inventive debris trap 10 discussed include three female support brackets 20b attached to their front sides to facilitate removal using remote tooling, such as a long rod or a robotic arm R fitted with male brackets 32 (see FIG. 8) which are complementary to the female support brackets 20b and which are designed to engage the female support brackets 20b. However, as with the preferred embodiment, other means of attachment may be used. Additional remote tooling consisting of a long rod or a robotic arm with an impacting hammer that can apply a vibratory force to the bottom of the debris trap 10 may be required to loosen the connection between the male and female support brackets 32, 20. Furthermore, other suitable devices which can safely remove the debris trap 10 without exposing personnel to excessive radiation may be used. For example a robotic arm R with a clamping device could be used that would apply a force to the side of the debris trap 10 could be used. If the radiation field is sufficiently low personnel with protective clothing could be used to remove the debris trap.

The operating principle for the debris trap 10 is to allow the flow 46 containing the debris to enter the top of the debris trap 10 and enter the settling chamber 48 through the gap 22a or the slot 22b. After fluid enters the trap 10 it changes direction before it flows slowly upwards and exists through the plurality of small holes 24 near the top of the trap 10.

Provided that the vertical velocity of the flow 46 in the trap 10 after the flow 46 turns upwards is less than the settling velocity the particle will stay in the trap 10. In other words the condition which causes retention of the particles within the trap 10 is the downward force on the particle due to gravity being larger than the upward drag force on the particle exerted by the flow 46 of primary fluid within the debris trap 10. The pressure differential available to cause flow 46 in the debris trap 10 is a function of fluid impingement velocity and the lower static pressure at the exit of the plurality of small holes 24.

Thus, the multiple small holes located near the top of the settling chamber 48 are sized to control the upward velocity in the settling chamber to less than the particle settling velocity. That is to say that they are sized to ensure that the gravitational force exerted on the debris entrained in the primary flow 46 is larger than the upward drag force exerted on the debris by the flow 46 itself. This ensures that debris which enters the trap will settle to the bottom of the trap. The settling chamber is the portion of the debris trap upstream of the vent holes.

Besides capturing radioactive debris other key design requirements for the debris trap 10 of the present invention are as follows. Firstly it must stay securely in place during operation. In addition, it must not have any parts that can become loose within the PHT system. It is also essential that the debris trap 10 fit through the manway in the primary head of a steam generator for easy installation. The inventive debris trap 10 must also be light, preferable less than 20 lb (9 kg) and hence easy for one person to install. Furthermore, it must be easy to enclose in a dust tight radioactively shielded envelope to allow handling and removal for safe storage. It must also be easy to remove and easy to transport to the storage site for radioactive waste after the radioactive debris has been captured. Finally it must be small enough so it does not significantly increase the primary heat transport system flow losses.

The inventive radioactive debris trap 10 is suitable for installation in any steam generator and is capable of removing radioactive debris that may be present in any nuclear power plant PHT system. The radioactive debris trap 10 could be installed during a typical boiler outage, while the head is open and PHT system is already in a low-level drain state. The outlet side is chosen not only because it is less turbulent than the inlet, but also because the flow from a few select tubes that contain a higher than average concentration of debris particles may be targeted to be "partially filtered" without disrupting all of the primary flow.

The key advantage of installing a debris trap inside the boiler is that the device has a very high probability of capturing most of the particles over the period of one reactor operating cycle of say 8000 hours. It is expected that the debris will be more concentrated in areas of direct primary inlet flow impingement, including tube ends near the center of the steam generator and near the divider plate 50. By locating the debris trap below the outlet ends of such tubes it is expected that the flow entering the debris trap will contain a relatively concentrated stream of debris which is available for capture within the debris trap.

During development of the inventive trap 10 tests were conducted by dropping small pieces of wire which was 0.017" diameter by 0.017" long into a container filled with 55° F. water. A stop watch was used to time how long it took the particles to drop to the bottom of the container. The average free fall velocity during the test was 0.61 ft/sec. The small holes at the outlet of the debris trap are sized to achieve a vertical velocity in the debris trap of 0.3 ft/sec which is half the settling velocity in the test. Larger particles tend to have a higher settling velocity than small ones. Hence this test confirms the debris trap will capture all particles greater than 0.017" in diameter, which is the majority of the particles large enough to cause problems.

Additionally, an approximate efficiency analysis may be performed using as an example, a power plant having eight steam generators per reactor. Each steam generator has 4200 tubes for a total of 33,600 tubes in all the steam generators. There are two reactor coolant pumps for each bank of four steam generators. Assuming the radioactive debris trap 10 of the present invention is installed in two steam generators, (one steam generator in each group of steam generators supplied by the same pumps), it is expected that over time most of the debris will be removed. The debris trap will filter a small fraction of the fluid coming from the ends of the tubes directly above the debris trap. Table 1 shows the expected particle removal rate based on the assumption that debris is uniformly distributed within the primary fluid.

TABLE 1

Particle Removal with Debris Trap Installed

| Time (hours) | Particles in PHT system (kg) | % of particles removed |
|---|---|---|
| 0 | 3 | 0% |
| 50 | 2.08 | 31.3% |
| 100 | 1.43 | 52.8% |
| 200 | 0.67 | 77.7% |
| 400 | 0.15 | 95.0% |
| 800 | 0.01 | 99.8% |

A Computational Fluid Dynamic (CFD) analysis that includes particle tracking throughout the system will be used to more accurately predict the distribution of particles in the boiler tubes and in the debris trap as a function of time.

While specific embodiments of the present invention have been shown and described in detail to illustrate the application and principles of the invention, it will be understood that it is not intended that the present invention be limited thereto and that the invention may be embodied otherwise without departing from such principles. In some embodiments of the invention, certain features of the invention may sometimes be used to advantage without a corresponding use of the other features. Accordingly, all such changes and embodiments properly fall within the scope of the following claims.

What is claimed is:

1. A radioactive debris trap (10) to be installed a steam generator having a primary head for the purpose of removing debris entrained in a primary flow (46) of a nuclear power plant's primary heat transport system, the debris trap (10) comprising:

an outer cylinder (12) comprising an outer surface, a top end, a bottom end, a back side and an opposite front side having a perimeter;

an inner cylinder (14) located within the outer cylinder (12) and coaxial therewith, the inner cylinder (14) comprising a top end and a bottom end;

a top plate (16) which connects the top end of the outer cylinder (12) to the top end of the inner cylinder (14);

a plurality of small holes (24) located at the top end of the outer cylinder (12) through which liquid exits the debris trap (10), the plurality of small holes (24) being sized to ensure that the gravitational force exerted on the debris entrained in the primary flow (46) is larger than the upward drag force exerted on the debris by the flow (46) itself;

an annular cavity located between the outer cylinder (12) and the inner cylinder (14), the annular cavity comprising a settling chamber (48) positioned below the plurality of small holes (24);

a bottom plate (18) connected to the perimeter of the bottom end of the outer cylinder (12) which encloses the radioactive debris trap (10);

a gap (22a) located between the bottom end of the inner cylinder (14) and the bottom plate (18) through which primary flow (46) with debris entrained therein enters the settling chamber (48);

a means for fixedly connecting the radioactive debris trap (10) to the steam generator, the means being fixedly attached to the outer surface of the outer cylinder (12); and a means for removing the radioactive debris trap (10) from the steam generator without exposing personnel to excessive radiation.

2. The radioactive debris trap (10) according to claim 1, wherein the radioactive debris trap (10) is comprised of metal.

3. The radioactive debris trap (10) according to claim 1, wherein the radioactive debris trap (10) has a weight of less than or equal to 20 pounds.

4. The radioactive debris trap (10) according to claim 1, wherein the top plate (16) is conical in shape.

5. The radioactive debris trap (10) according to claim 1, wherein:

the means for fixedly connecting the radioactive debris trap (10) to the steam generator comprises three female support brackets (20) attached to the outer surface of the outer cylinder (12) on the back side of the debris trap (10), the three female support brackets (20) being triangularly arranged with respect to each other; and the means for removing the radioactive debris trap (10) from the steam generator comprising three female support brackets (20b) attached to the front side of the debris trap (10), the three female support brackets (20b) being triangularly arranged with respect to each other and configured to facilitate removal of the debris trap (10) from the steam generator by a robotic arm (R) provided with complementary male support brackets (32) for engaging the female support brackets (20b).

6. The radioactive debris trap (10) according to claim 5, wherein:

the means for fixedly connecting the radioactive debris trap (10) to the steam generator further comprises a locking tab bolt (70), having a hex head (72) and a foldable locking tab (74); and the three female support brackets (20b) attached to the front side of the debris trap (10) comprising a single centrally positioned upper bracket having a pilot hole (60) for accommodating the locking tab bolt (70).

7. The radioactive debris trap (10) according to claim 1, wherein the steam generator comprises:

a divider plate (50) attached to the side of the steam generator's primary head; and a debris trap support base plate (28) and three male support brackets (32), the debris trap support (26) being fixedly attached to the divider plate (50);

wherein the means for fixedly connecting the radioactive debris trap (10) to the steam generator comprises three female support brackets (20) positioned on the back side of the debris trap (10) and fixedly attached to the outer surface of the outer cylinder (12) and being configured to facilitate attachment to the male support brackets (32) of the debris trap support base plate (28).

8. The radioactive debris trap (10) according to claim 7, wherein the female support brackets (20) positioned on the back of the debris trap (10) are welded to the outer surface of the outer cylinder (12) and the debris trap support (26) is welded to the divider plate (50).

9. The radioactive debris trap (10) according to claim 7, wherein the debris trap support (26) further comprises a plurality of pilot holes (34) positioned on the base plate (28) for accommodating fasteners which facilitate attachment of the debris trap support (26) to the divider plate (50), wherein the three female support brackets (20) positioned on the back side of the debris trap (10) are bolted to the outer surface of the outer cylinder (12).

* * * * *